UNITED STATES PATENT OFFICE.

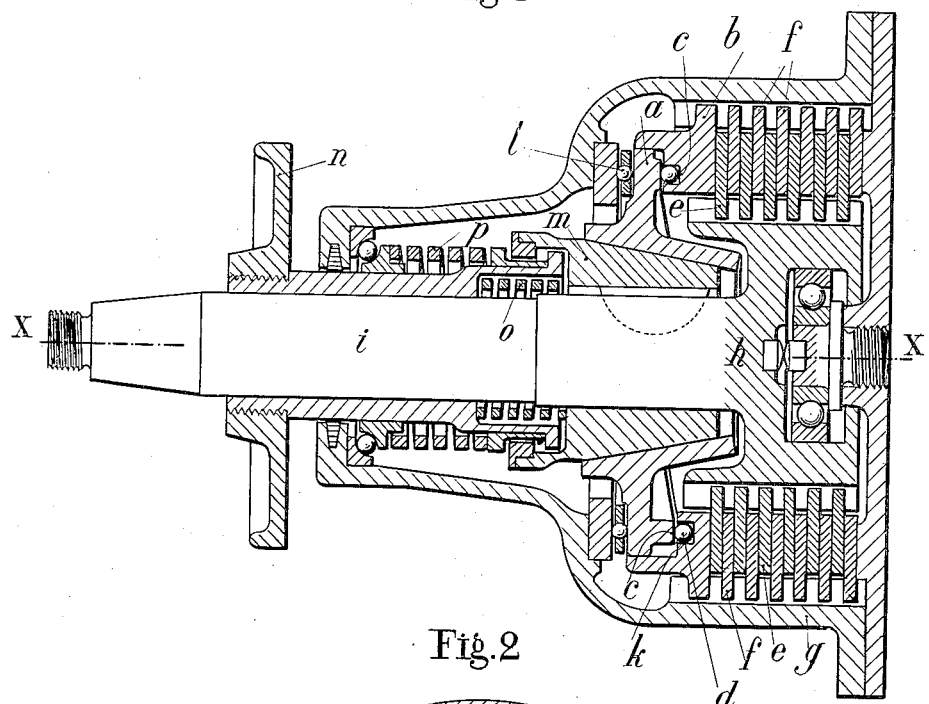
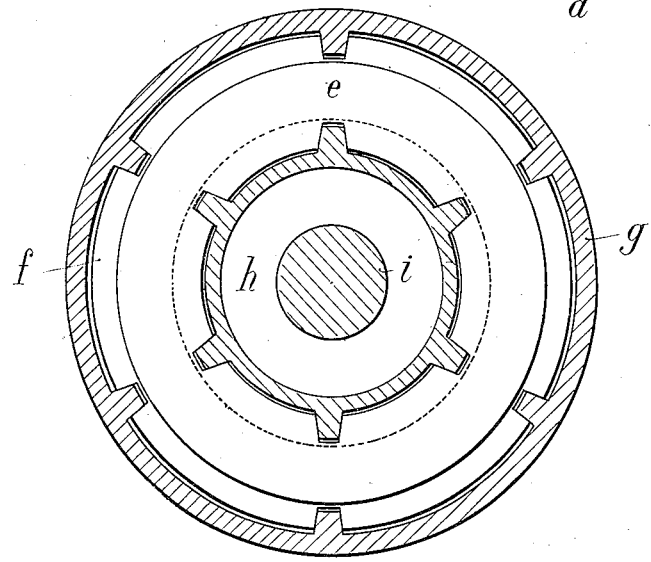

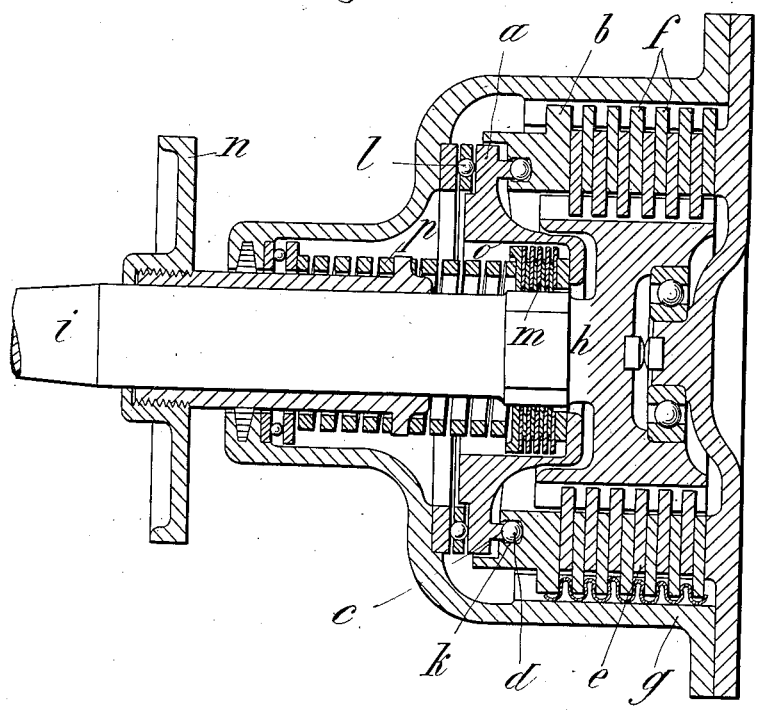
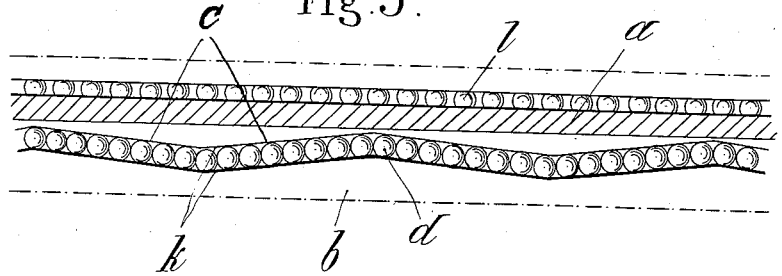

RENÉ GUILLERY, OF AUBERVILLIERS, FRANCE.

CLUTCH OR LIKE APPARATUS.

1,159,663. Specification of Letters Patent. Patented Nov. 9, 1915.

Application filed September 27, 1913. Serial No. 792,204.

*To all whom it may concern:*

Be it known that I, RENÉ GUILLERY, a citizen of the French Republic, residing at Aubervilliers, France, have invented certain new and useful Improvements in Clutches or like Apparatus, of which the following is a specification.

This invention relates to clutch actuating means.

This device is chiefly characterized by the driving force which it is desired to multiply or increase, producing a modification in the relative speeds of two parts, one of which depending on the motor, drives the other. Conjugated inclined planes are provided in the two parts and suitable ball bearings are arranged between these inclined planes. The change of speed, thus produced between the two parts, brings about a change of their relative lateral and axial positions, which, by means of inclined planes and balls inserted therein, is transformed into a relative movement along the joint axis of angular driving. This longitudinal movement can be utilized for obtaining any suitable drive, and in case of a clutch, acts on the adjustable part of the latter so as to produce the driving force. Moreover, for producing the change of speeds between the two parts of the servomotor or clutch thus constituted, the force to be multiplied (in the present case that of the clutch spring), acts on an auxiliary clutch by means of which it is possible to modify at will the speed of driving of one of the said parts and to produce the relative change in the angle of keying of the inclined planes, which must operate the chief clutch.

In the accompanying drawings given by way of example Figures 1 and 2 show in longitudinal and cross-section a construction of the control device according to this invention, applied to a disk clutch, but it is obvious that the clutch to be operated, could be any desired. Fig. 3 shows the development of the inclined planes belonging to the two parts, the change in the angular displacement of which, when the respective speeds of driving are varied, controls the clutch. Fig. 4 is a modified construction of the said control mechanism.

The clutch properly speaking is constituted by alternately placed plates $e$, $f$, the plates $f$ being driven by a box $g$ secured to the motor, and the plates $e$ driving the shaft $i$ by means of the disk $h$. The last plate $b$ of the group $f$ is provided with a circular groove $k$ filled with balls $d$ which engage with one face of a disk $a$. The rolling tracks $c$, while being concentric with the axis $x$—$x$ of the clutch, are made of wavy or sinuous shape as shown in the development in Fig. 3, so that the bottom of the groove and the corresponding face of the disk $a$, form corresponding inclined planes. Owing to this arrangement, it will be seen that the disk $a$ will rotate with the box $g$ and the plates $f$. In fact the distance between the back of the balls $l$ and the back of the first plate $f$ is constant. The only variable length is the total thickness of the packet of the plates $f$ and $e$, which thickness is greater when they are separated, that is to say disconnected, than it is when they are pressed together, that is to say thrown into gear. But in the system according to this invention, the tightening or pressing together of the plates $f$, $e$ is produced by the rotation of the disk $a$. Owing to this rotation, the inclined planes $c$ act on each other by means of the balls $d$ which modify the degree of tightening of the plates. In order to throw the clutch into or out of gear, it will be therefore sufficient to give to the disk $a$ a movement so as to change its angular position relative to the plate $b$, the said movement rendering operative the inclined planes to move the plate $b$ laterally. To that end, to the principal clutch transmitting the power of the motor to the driven shaft $i$, is added a small clutch $m$, the action of which brings about the said change between the parts $a$ and $b$. In fact, assuming that the apparatus is thrown out of gear, it will be seen that the plates $e$ $f$ of the main clutch are separated. The two inclined planes $c$ are arranged relatively as shown in Fig. 3, so that the available length for the loosening of the plates should be sufficient. The clutch member $m$ is thrown out of gear by outside control by means of the disk $n$, the spring $p$ being compressed. If the control of the clutch is operated the disk $n$ will advance under the action of the spring $p$, which will bring about the throwing into gear of the clutch member $m$. As the disk $a$ is rotating, and the part $m$ is at that moment standing still, the throwing into gear has the tendency to modify the speed of the disk $a$, whereby the inclined planes of which are given a new relative position to those of the plate $b$ and, in coöperation therewith, bring the plates $e$ $f$ nearer together and consequently throw the clutch into gear.

Fig. 4 is a modified construction of the device in which the cone clutch member $m$ is replaced by a small disk clutch.

In order to render the throwing into gear more progressive, the driving spring may be arranged in a special manner. Instead of being constituted by a single spring, it may consist of two springs of equal power. The spring $o$ acts on the cone $m$ resting on the spring $p$. When throwing out of gear, the spring $p$ is compressed completely, while the spring $o$ gradually expands, and its length is such that when the spring $p$ is compressed, the spring $o$ no longer exercises any pressure on the clutch.

What I claim as my invention and desire to secure by Letters Patent is:—

1. In combination in a clutch operating device, a laterally movable plate controlling the operation of the clutch, a disk adjacent to said plate and adapted to be rotated thereby, a clutch for changing the speed of said disk in relation to said plate, and means whereby said change of speed of said disk acts upon said plate to operate the main clutch, substantially as described.

2. In combination in a clutch operating device, a laterally movable plate controlling the operation of the clutch, a disk adjacent to said plate and adapted to be rotated thereby, a clutch for changing the speed of said disk in relation to said plate, and inclined planes on the adjacent faces of said plate and said disk.

3. In combination in a clutch operating device, a laterally movable plate controlling the operation of the clutch, a disk adjacent to said plate and adapted to be rotated thereby, a clutch for changing the speed of said disk in relation to said plate, inclined planes on the adjacent faces of said plate and said disk, and a peripheral groove with balls therein in one of said adjacent faces, substantially as described.

In testimony whereof I have signed my name to this specification in the presence of two subscribing witnesses.

RENÉ GUILLERY.

Witnesses:
HANSON C. COXE,
GEORGES BONNEUIL.